(12) United States Patent
Johansson et al.

(10) Patent No.: US 7,044,247 B2
(45) Date of Patent: May 16, 2006

(54) DEVICE AT RO-RO VESSEL

(75) Inventors: Göran Johansson, Göteborg (SE); Bengt Ramne, Västra Frölunda (SE)

(73) Assignee: TTS Ships Equipment AB, Gothenburg (SE)

( * ) Notice: Subject to any disclaimer, the term of this patent is extended or adjusted under 35 U.S.C. 154(b) by 81 days.

(21) Appl. No.: 10/297,417

(22) PCT Filed: Jun. 20, 2001

(86) PCT No.: PCT/SE01/01394
§ 371 (c)(1), (2), (4) Date: Dec. 5, 2002

(87) PCT Pub. No.: WO01/98136
PCT Pub. Date: Dec. 27, 2001

(65) Prior Publication Data
US 2004/0112660 A1 Jun. 17, 2004

(30) Foreign Application Priority Data
Jun. 22, 2001 (SE) .............................................. 0002383

(51) Int. Cl.
*B60T 7/16* (2006.01)
*B60T 7/12* (2006.01)
*G01C 22/00* (2006.01)
*B63B 27/00* (2006.01)
*B60Q 1/00* (2006.01)

(52) U.S. Cl. ................. 180/169; 180/168; 180/167; 701/96; 701/23; 414/140.1; 414/140.8; 414/673; 340/435; 340/436; 340/988

(58) Field of Classification Search ................. 180/167, 180/168, 169, 170; 701/96, 23, 117, 119; 340/435, 436, 902, 903, 904, 907, 988; 414/139.4, 414/139.9, 140.1–140.5, 143.2
See application file for complete search history.

(56) References Cited

U.S. PATENT DOCUMENTS 2,672,840 A * 3/1954 Sharp et al. ................. 114/70
3,561,617 A * 2/1971 Marsh ....................... 414/140.1
4,055,263 A * 10/1977 Freeman ..................... 414/803

(Continued)

FOREIGN PATENT DOCUMENTS

| DE | 3930109 C | * | 11/1990 |
| EP | 425221 A2 | * | 5/1991 |
| JP | 362105794 | * | 5/1987 |
| JP | 08221123 A | * | 8/1996 |
| JP | 2000118995 A | * | 4/2000 |

OTHER PUBLICATIONS

WO 0066420, Sep. 11, 2000, PCT, Device at a System for Handling Cargo, Hamworthy KSE AB.
Jia Yongyu "AGV and Application of the Same." (Chengde Conveyor Group Co., Ltd., Chengde, Hebei Province, 067001).

*Primary Examiner*—Christopher Ellis
*Assistant Examiner*—G B Klebe
(74) *Attorney, Agent, or Firm*—Orum & Roth LLC

(57) ABSTRACT

The present invention relates to an arrangement for a Ro—Ro vessel, which exhibits a number of cargo-receiving spaces provided with a driving surface internally in the vessel, and with a ramp extending between one such space and a quay, along which ramp driverless cargo handling vehicles (7), known as AGV vehicles, are capable of being driven between designated parking places for the purpose of transporting cargo between the quay and the aforementioned cargo-receiving space of the vessel. Means (9) are provided for causing the cargo handling vehicles (7) to be guided between the aforementioned spaces and the quay and into the intended train of vehicles in the designated location in a line (II) and without connecting the cargo handling vehicles (7) to one another.

20 Claims, 7 Drawing Sheets

U.S. PATENT DOCUMENTS

| | | | | |
|---|---|---|---|---|
| 4,221,530 A | * | 9/1980 | Williams et al. | 414/673 |
| 4,328,422 A | * | 5/1982 | Loomer | 250/239 |
| 4,480,714 A | * | 11/1984 | Yabuta et al. | 180/290 |
| 4,770,589 A | * | 9/1988 | Bryan | 414/140.8 |
| 4,802,096 A | * | 1/1989 | Hainsworth et al. | 701/301 |
| 4,846,297 A | * | 7/1989 | Field et al. | 180/169 |
| 4,947,094 A | * | 8/1990 | Dyer et al. | 318/587 |
| 4,950,118 A | * | 8/1990 | Mueller et al. | 414/274 |
| 5,005,128 A | * | 4/1991 | Robins et al. | 701/23 |
| 5,202,742 A | * | 4/1993 | Frank et al. | 356/5.1 |
| 5,283,739 A | * | 2/1994 | Summerville et al. | 701/23 |
| 5,367,456 A | * | 11/1994 | Summerville et al. | 701/24 |
| 5,572,449 A | | 11/1996 | Tang et al. | |
| 5,810,506 A | | 9/1998 | Netzler | |
| 5,812,267 A | * | 9/1998 | Everett et al. | 356/614 |
| 6,032,097 A | | 2/2000 | Iihoshi et al. | |
| 6,049,745 A | * | 4/2000 | Douglas et al. | 701/23 |
| 2004/0199306 A1 | * | 10/2004 | Heilmann et al. | 701/23 |
| 2004/0210358 A1 | * | 10/2004 | Suzuki et al. | 701/23 |

\* cited by examiner

DEVICE AT RO-RO VESSEL

The present invention relates to an arrangement for a Ro—Ro vessel, which exhibits a number of cargo-receiving spaces provided with a driving surface internally in the vessel, and with a ramp extending between one such space and a quay, along which ramp driverless cargo handling vehicles, known as AGV vehicles, are capable of being driven between designated parking places for the purpose of transporting cargo between the quay and the aforementioned cargo-receiving space of the vessel.

Previously disclosed is a method of causing cargo handling vehicles of the intended kind to be guided in port areas with the help of so-called transponders. However, since such previously disclosed transponders function with GPS and require unobstructed access upwards into the air, their use is not possible inside spaces which are covered by a roof, such as inside vessels with decks. Vessels which are completely open in a direction upwards do not permit a large amount of cargo to be carried at any time, since only a single load plan can be used for this purpose, namely above the top deck of the vessel.

Cargo handling trucks and similar cargo handling vehicles have means for causing the vehicles to be guided to desired locations indoors, for example in storage areas, workshops, production areas, etc. These guidance means do not, however, solve the problem of speeding up the loading and unloading of vessels alongside quays in port areas. A very considerable problem is associated with the fact that vessels spend far too much time alongside the quay and incur unnecessarily high costs, such as for quay dues and loading personnel.

The principal object of the present invention is thus, in the first instance, to solve the aforementioned problems simply by reliable and efficient means.

The aforementioned object is achieved by means of an arrangement in accordance with the present invention, which is characterized essentially in that means are provided for causing the cargo handling vehicles to be guided between the aforementioned spaces and the quay and into the intended train of vehicles in the designated location in a line and without connecting the cargo handling vehicles to one another.

The invention is described below as a number of preferred illustrative embodiments, in conjunction with which reference is made to the accompanying drawings, in which.

Figure 1:
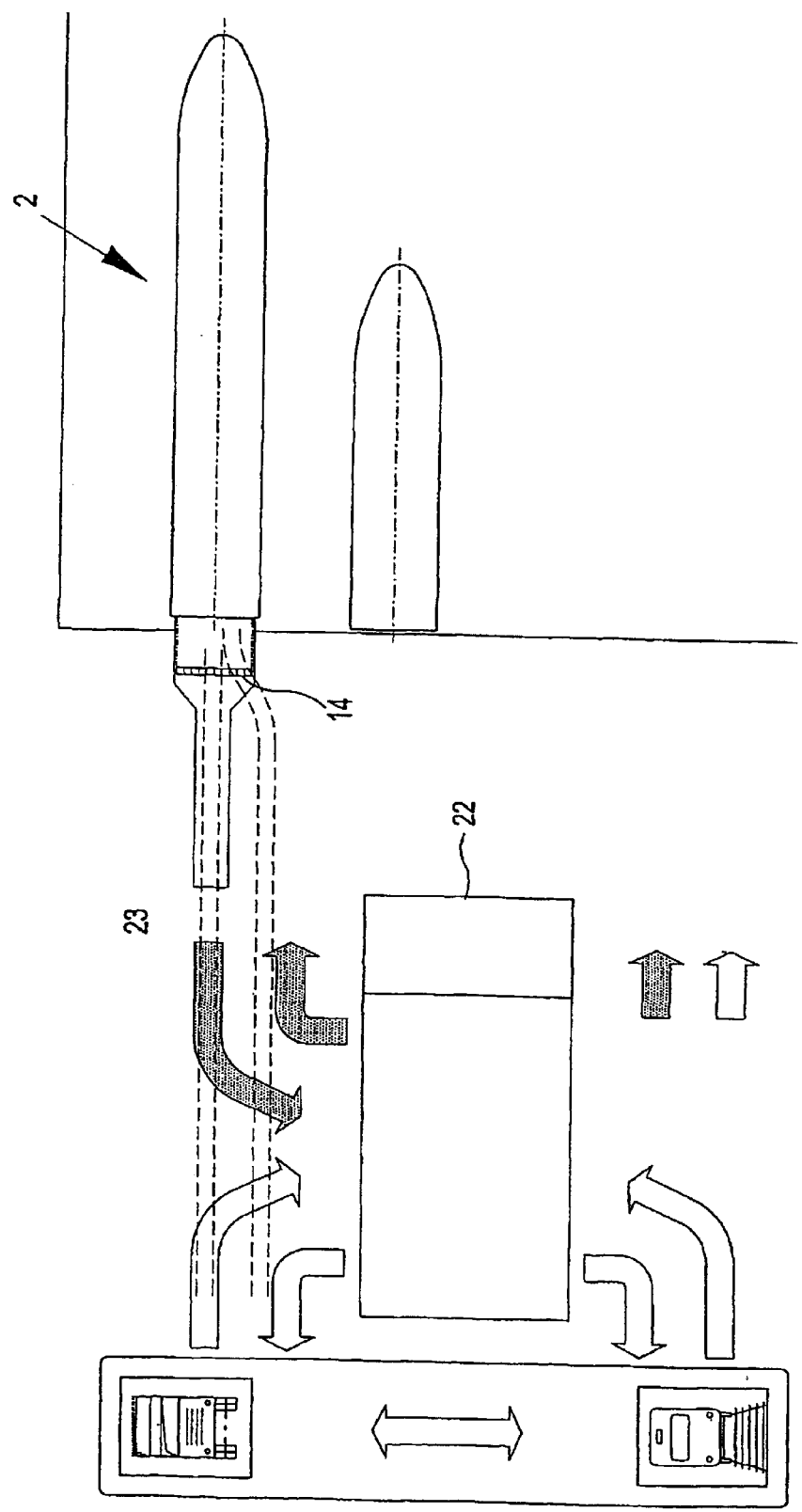
FIG. 1 shows a schematic view from above of a loading terminal in a port area.
Figure 2:
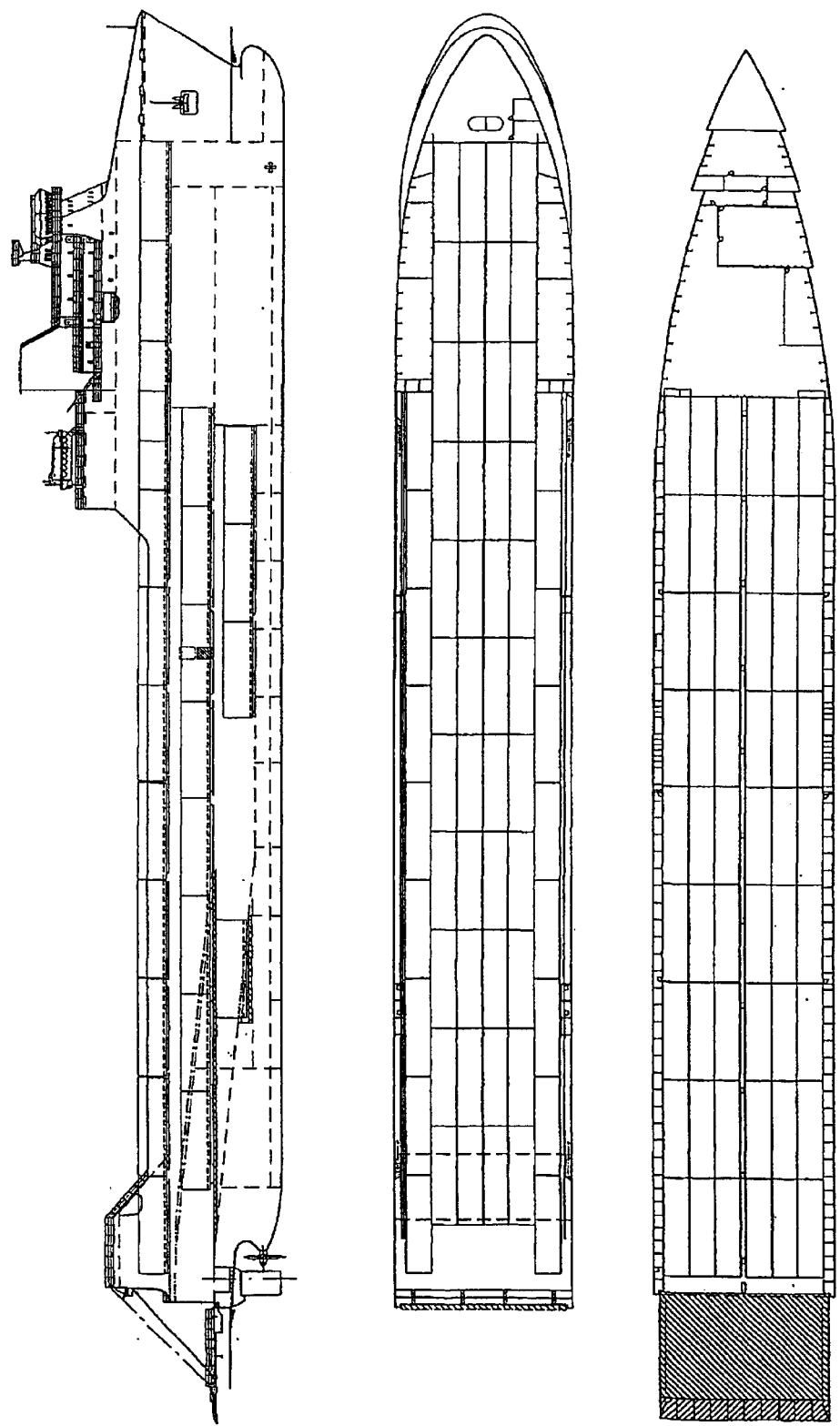
FIG. 2 shows a view of a vessel with cargo spaces.
Figure 3:
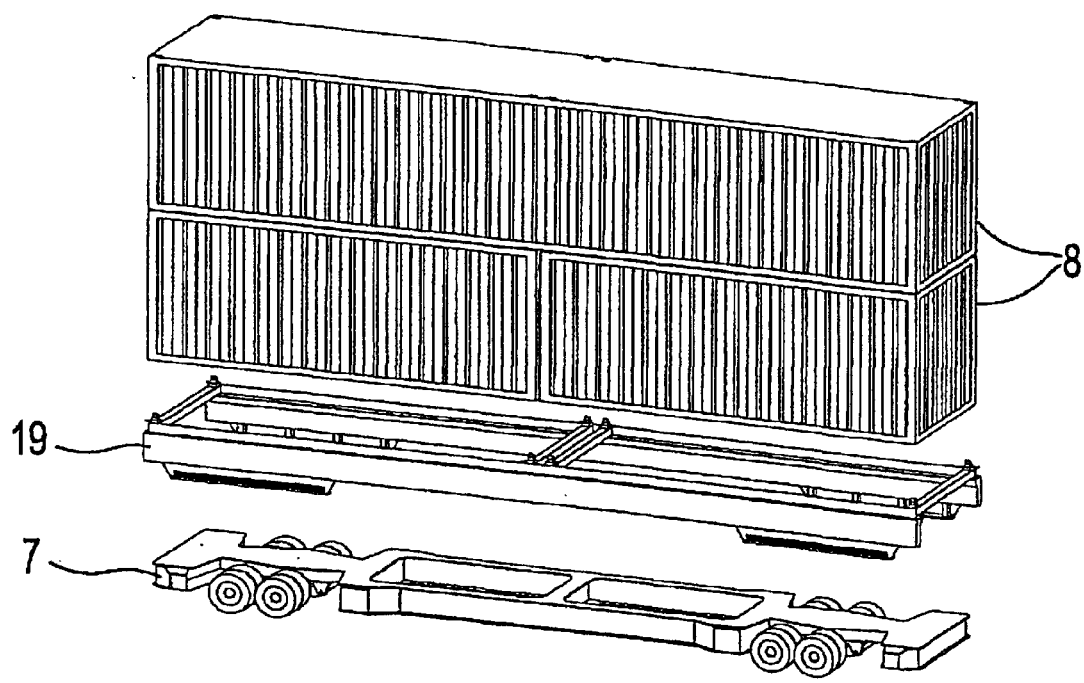
FIG. 3 shows an exploded view of the load carrier of a cargo handling vehicle with its load.
Figure 4:
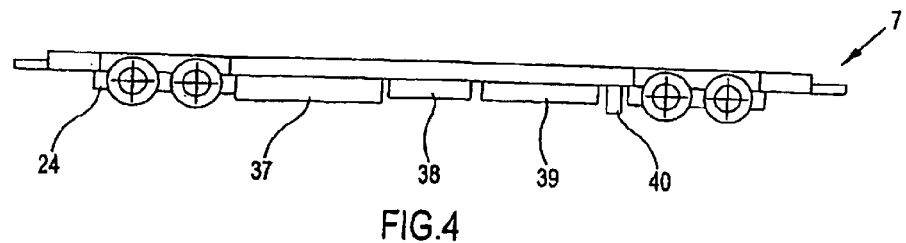
FIGS. 4–6 show the locations of sensors and other devices in so-called AGV vehicles in accordance with the invention.

An arrangement 1 for a Ro—Ro vessel 2, which exhibits a number of cargo-receiving spaces 4 provided with a driving surface 3–3n internally in the vessel 2, and which has a pivotally mounted ramp 14 of a previously disclosed kind preferably supported by the vessel 2 and extending between one such space 4 and a quay 5, along which ramp driverless cargo handling vehicles 7, known as AGV vehicles, are capable of being driven between designated parking places for the purpose of-transporting cargo 8 between the quay 5 and the aforementioned cargo-receiving space 4 of the vessel, comprises guidance means 9 for performing this task automatically. More specifically, the aforementioned guidance means 9 are so arranged as to cause cargo handling vehicles 7 to be guided to the designated location in a line I, II and without any mechanical, electrical or other physical connection of cargo handling vehicles 7 to one another, i.e. the cargo handling vehicles 7 are driven in the form of a train with a restricted train length, but without being connected together.

The aforementioned guidance means 9 may, for example, comprise means for laser guidance, optical guidance, cable guidance or a combination of at least two of the aforementioned guidance means.

The aforementioned guidance means 9 are preferably so arranged as to act in a transverse sense 27 viewed in relation to the intended direction of travel 26 of the vehicles. For example, the aforementioned guidance means 9 can act against the deck 12 of the vessel, against the bulkhead 13 of the vessel, against the loading ramp 14 of the vessel and/or against lateral guide rails 15 which are set up in order to delimit the intended driving surfaces 3–3n and the cargo spaces 4 of the vessel 2.

Data collected in respect of the relative lateral 27 position of the cargo handling vehicles 7 is so arranged as to be utilized by a unit included in the arrangement 1 for the purpose of determining the relative positions of the cargo handling vehicles in the driving line I, II in order to permit determination of the speed at which the vehicles must be driven in order to arrive at the right destination.

All the vehicles 7 incorporate a unit 17, from which data from the vehicle 7 that is first in the intended train of vehicles 18 is transmitted to other vehicles 71 concerning the speed, distance and positions of the vehicles.

Positioned between the cargo handling vehicles 7 and the load carrier 19, which is preferably in the form of load cassettes capable of being carried on the cargo handling vehicle 7, are position sensors 33, which are so arranged as to determine the relative positions of the vehicle 7 and the load carrier 19, for example in the longitudinal and vertical directions.

Sensors 31, which are so arranged as to sense obstructions in the intended route of the vehicles 7, are also positioned at the front of the aforementioned vehicles 7.

It can be stated generally that the aim of the automatic guidance is for the AGV vehicles to be guided from the quay to a predetermined point on the deck of the vessel, and also in the reverse sequence. The expression guidance not only denotes assigning a position, but also involves the following:

Load planning, programming of all AGV vehicle positions on the deck of the vessel that is to be shipped out, and planning of quay-berths in conjunction with unloading;

Control of the AGV vehicle park. All AGVs to be loaded/unloaded are identified on the vessel's quay or deck.

Activation of the AGV vehicles' locking mechanisms.

Activation of the AGV vehicles' lowering/raising.

Activation of the AGV vehicles' drive equipment (brake+engine+steering).

Starting up an AGV vehicle or several vehicles in a train for driving to an assigned position on the vessel's deck or quay in accordance with the load plan.

The traffic flow in the port area 22 is shown in FIG. 1 with arrows, and the vehicles 7 can be guided in the aforementioned area by previously disclosed transponders, for example of a kind which function with GPS, and in the vicinity 23 of the loading ramp 14 they are switched to function with guidance means in accordance with the present invention, as described above.

The aforementioned ACV vehicles 7 can be of a previously disclosed kind, which exhibits hydraulic driving and lifting systems 24 for the hoisting function of the vehicle for load carrier 19 that are capable of being supported above it.

Figure 5:
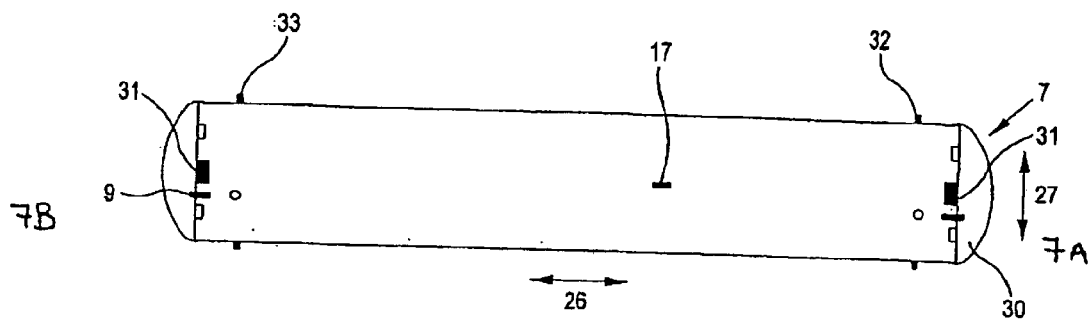
Figure 6:
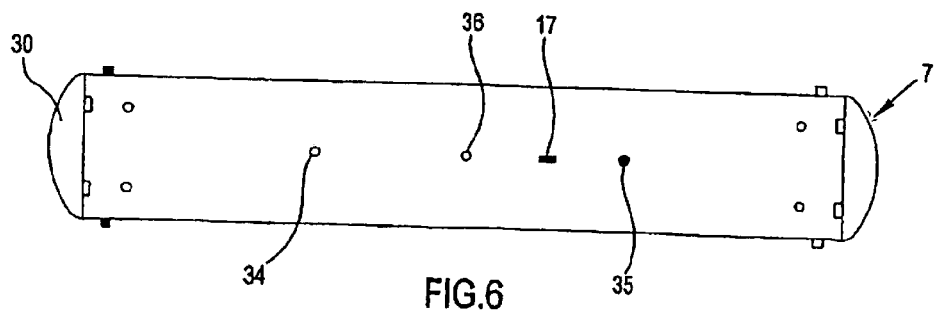

Shown in FIG. 5 are optical guidance means 9, which are so arranged as to emit light in the transport direction 26 of the vehicle and/or in the transverse direction 27 of the vehicle, and corresponding sensor devices, for example laser reflectors, are arranged at the end areas 28 of the driving surfaces 3–3$n$, for example on a transverse bulkhead 29.

Situated at either end 7A, 7B of the vehicle 7 are bumpers 30 for the purpose of sensing the presence of an adjacent vehicle 7 and damping their contact with one another.

A laser sensor 31 can also be arranged on the vehicles 7 at their respective ends 7A, 7B together with a digital camera 32.

Sensors 33, 34, 35, 36 can also be present on the vehicle 7, for example for the purpose of fine-positioning the vehicle 7, angular adjustment of the vehicle 7 and as load sensors.

The engine 37, fuel tank 38, vehicle control system 39 and transponder antenna 40 can be placed beneath the vehicles 7.

Also present on board the vessel 2 is a central control unit, which is so arranged as to transmit signals to the respective vehicles 7 to inform them of the determined positions.

Figure 10:
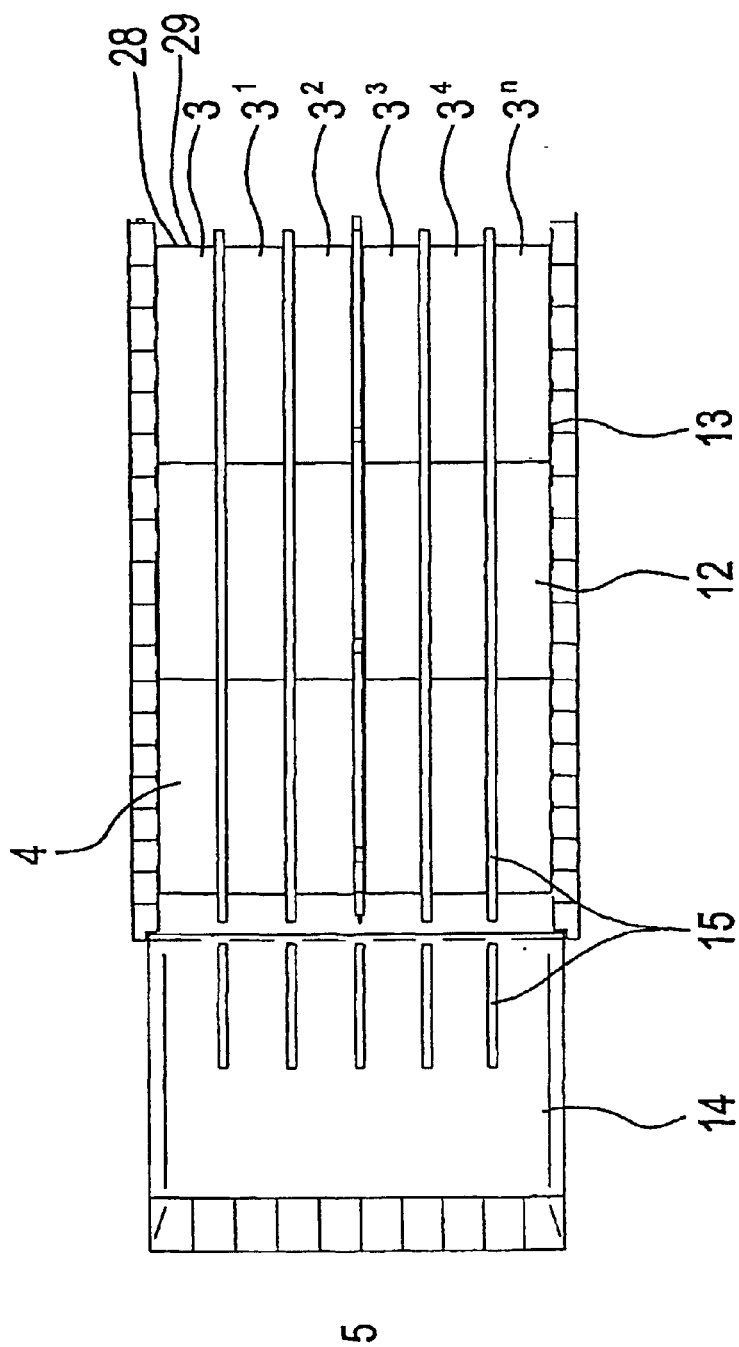
FIG. 10 shows a loading ramp and a part of the cargo space of the vessel.

The solution with cable control shown in FIG. 10 comprises an electrical cable laid in grooves in the deck and/or in lateral guide rails 15. Different frequencies are induced in the individual cables, for the purpose on the one hand of guiding the vehicles 7 to the designated location and also of dealing with intersections with the rest of the cable loop. The antenna of an AGV vehicle 7 receives frequency signals and guides the AGV vehicles 7 accordingly to the desired location with the vehicles 7 connected together in a line and with the vehicles 7 arranged one after the other in the form of a train.

Figure 7:
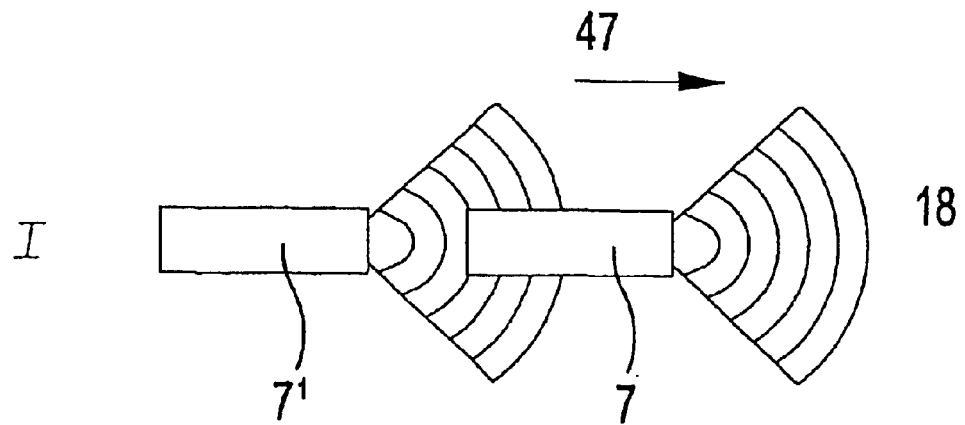
FIGS. 7 and 8 show vehicles which are driving in a line guided in accordance with the invention at a mutual distance from one another.
Figure 8:
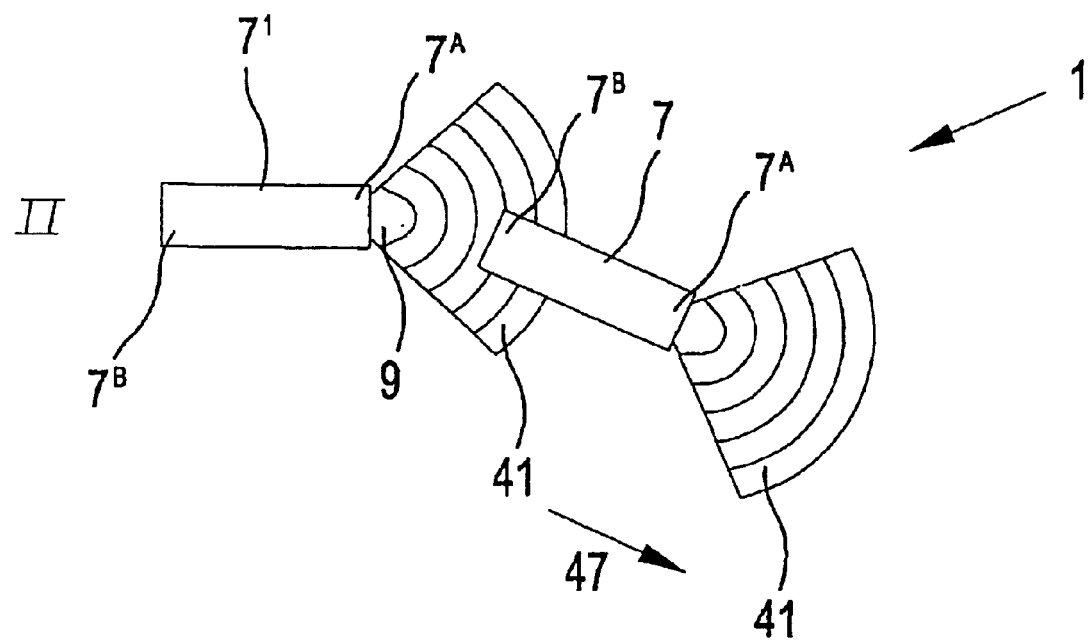
Figure 9:
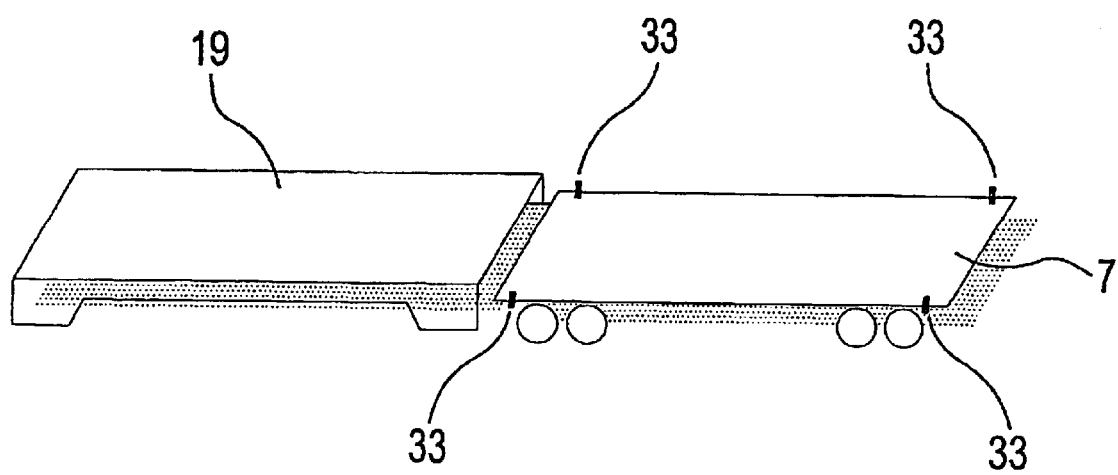
FIG. 9 shows sensors and their location on vehicles and load carriers.

The virtual connection of vehicles 7 in a line in accordance with the present invention permits a vessel 2 to be loaded or unloaded rapidly and efficiently, since the vehicles follow one another along a designated envisaged route and at a desired relative distance from one another in a similar fashion to a mother duck with small ducklings obediently and effectively following the mother and their siblings closely in line in an intended common direction 47, for example as shown in FIGS. 7 and 8.

FIGS. 7 and 8 show how the guidance means 9 transmits laser waves 41 at an angle of at least 90° at the front 7A of the vehicle, viewed in the direction of travel 26, although means for transmission at an angle of 360° can also be utilized. Reflectors are also fitted in this embodiment, which are capable of sensing at a angle of 360°, namely with round, cylindrically shaped reflectors. This permits the achievement of a simplified reflector environment, since scanners with all-round reflectors can receive impulses from the reflectors over a greater angular interval.

All the vehicles 7 receive common information about the intended route from a terminal control system (not shown here), and the vehicles 7 are started simultaneously. The speed of all the vehicles 7 is synchronized very accurately in this way, and the first vehicle 7 in the line transmits its movement data to the following vehicles $7^1$ in the line, so that these can adjust their respective speeds to that of the locomotive vehicle 7.

Positioning on board the vessel 2 is achieved with the help of an arrangement in accordance with the invention, in conjunction with which the accuracy achieved on board can range from 10 cm up to 3 cm and even up to a few millimetres.

The most challenging problem is the ability to position the AGV vehicles 7 beneath the associated load carrier 19. Since the load carrier 19 themselves do not exhibit positioning systems, it is necessary for the vehicles 7 to have these.

Accurate positioning of the vehicle 7 beneath a load carrier 19 must take place with a precision of a few millimetres, and for this purpose use is made of position sensors 33 in the vehicles 7 at their respective corners. Once the vehicle 7 arrives at a load carrier, for example on the ground, the vehicle 7 must then be guided accurately in under the load carrier 19.

The position sensors 33 also measure the distance to the internal sides of the cassettes, and the vehicle is guided so that the distance to the load carrier 19 is the same on either side of it.

A train of vehicles in accordance with the invention also includes a smaller subsidiary quantity of cargo handling vehicles 7, which, for example, are instructed to leave the ordinary train that is being advanced or is stationary, but that it is wished to separate or to augment with a small quantity of cargo handling vehicles 7, for example in conjunction with the subdivision of long trains of vehicles into smaller train sets in conjunction with the loading and unloading of the vessel.

The invention is not restricted to the embodiment described above and illustrated in the drawings, but may be varied within the scope of the patent claims without departing from the idea of invention.

What is claimed is:

1. Arrangement for a Ro—Ro vessel, comprising
   a plurality of cargo-receiving spaces provided with a driving surface internally in the vessel,
   a plurality of cargo handling vehicles
   a ramp extending between one such space and a quay, along which ramp the driverless cargo handling vehicles, are capable of being driven between designated parking places for the purpose of transporting cargo between the quay and the cargo-receiving spaces of the vessel,
   at least one sensor,
   a laser guidance unit for the cargo handling vehicles to be guided between the spaces and the quay and into an intended train of vehicles in a designated location in the train and without connecting the cargo handling vehicles to one another, and
   an external terminal control system for controlling the cargo handling vehicles.

2. Arrangement in accordance with Patent claim 1, further comprising an optical guidance unit adapted to guide the cargo handling vehicles.

3. Arrangement in accordance with Patent claim 1, further comprising a cable guidance system adapted to guide the cargo handling vehicles.

4. Arrangement in accordance with claim 1, further comprising position sensors positioned between the vehicles and a load carrier wherein the position sensors are adapted for determining the relative positions of the vehicle and the load carrier.

5. Arrangement in accordance with claim 1, further comprising an obstruction sensor, arranged to sense obstructions in the intended route of the vehicles, positioned at the front of the vehicles.

6. Arrangement in accordance with claim 1, wherein each vehicle comprises a unit, adapted to receive data from the vehicle that is first in the train of vehicles concerning the speed and distance of the vehicles.

7. Arrangement in accordance with claim 6, further comprising position sensors positioned between the vehicles and a load carrier wherein the position sensors adapted for determining the relative positions of the vehicle and the load carrier.

8. Arrangement in accordance with claim 1, wherein the laser guidance unit is arranged to act transverse to the intended direction of travel of the vehicles.

9. Arrangement in accordance with claim 8, wherein the laser guidance unit acts transverse to the direction of travel of the cargo handling vehicle and is adapted to act against the deck of the vessel, against the bulkhead of the vessel, against the loading ramp of the vessel, and/or against guide rails.

10. Arrangement in accordance with claim 8, wherein each vehicle comprises a unit, adapted to receive data from the vehicle that is first in the train of vehicles concerning the speed and distance of the vehicles.

11. Arrangement in accordance with claim 8, further comprising position sensors positioned between the vehicles and a load carrier wherein the position sensors are adapted for determining the relative positions of the vehicle and the load carrier.

12. Arrangement in accordance with claim 8, further comprising a sensor, arranged to sense obstructions in the intended route of the vehicles, positioned at the front of the vehicles.

13. Arrangement in accordance with Patent claim 8, wherein each vehicle comprises a unit by which the speed of the vehicles is determined, and wherein data with respect to the lateral position of the vehicle and data with respect to the speed of the vehicles is utilized to determine the relative position of the vehicles.

14. Arrangement in accordance with claim 13, wherein each vehicle comprises a unit, adapted to receive data from the vehicle that is first in the train of vehicles concerning the speed and distance of the vehicles.

15. Arrangement in accordance with claim 13, further comprising position sensors positioned between the vehicles and a load carrier wherein the position sensors are adapted for determining the relative positions of the vehicle and the load carrier.

16. Arrangement in accordance with claim 13, further comprising a sensor, arranged to sense obstructions in the intended route of the vehicles, positioned at the front of the vehicles.

17. Arrangement in accordance with claim 13, wherein each vehicle comprises a unit, adapted to receive data from the vehicle that is first in the train of vehicles concerning the speed and distance of the vehicles, wherein the position sensors are adapted for determining the relative positions of the vehicles and the load carrier.

18. Arrangement in accordance with claim 17, further comprising an optical guidance unit, and/or a cable guidance system.

19. Arrangement in accordance with claim 14, further comprising position sensors positioned between the vehicles and a load carrier wherein the position sensors are adapted for determining the relative positions of the vehicle and the load carrier.

20. Arrangement in accordance with claim 19, further comprising an obstruction sensor, arranged to sense obstructions in the intended route of the vehicles, positioned at the front of the vehicles.

* * * * *